D. G. MOSHER.
Insect Destroyers.

No. 137,469. Patented April 1, 1873.

Witness:
Jas. E. Hutchinson
C. L. Evert

Inventor.
David G. Mosher
per Alexander Mason
Attorneys.

UNITED STATES PATENT OFFICE.

DAVID G. MOSHER, OF MOSHERVILLE, MICHIGAN.

IMPROVEMENT IN INSECT-DESTROYERS.

Specification forming part of Letters Patent No. 137,469, dated April 1, 1873; application filed February 19, 1873.

*To all whom it may concern:*

Be it known that I, DAVID G. MOSHER, of Mosherville, in the county of Hillsdale and in the State of Michigan, have invented certain new and useful Improvements in Insect-Destroyer; and do hereby declare that the following is a full, clear, and exact description thereof, reference being had to the accompanying drawing and to the letters of reference marked thereon making a part of this specification.

My present invention is intended as an improvement upon the insect-destroyer for which Letters Patent No. 119,389 were granted to me September 26, 1871; and it consists in the construction and arrangement of the box with the insect-receptacle having a hinged cover and an adjustable hinged clapper, as will be hereinafter more fully set forth.

In order to enable others skilled in the art to which my invention appertains to make and use the same, I will now proceed to describe its construction and operation, referring to the annexed drawing, in which—

Figure 1:
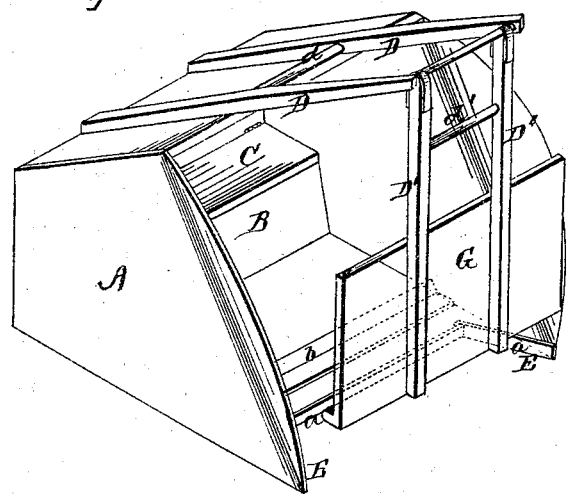
Figure 2:
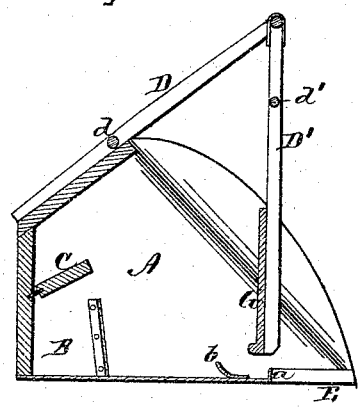

Figure 1 is a perspective view, and Fig. 2 a a vertical section, of my invention.

In my former patent, above referred to, I used a scoop-like box, the bottom of which was composed of a series of semi-cylindrical pointed tines, and in the rear part of the box was a chamber or receptacle having in its front side an upward-sliding door.

In the present case I construct my device as follows: A represents a scoop-like box of suitable dimensions, provided along the lower rear corner with a receptacle, B, having a trap-door or lid, C, on the top to secure the insects. The box A is provided with two tines, E, one on each side, and a flange, $a$, extends along the front edge of the bottom and along the inner side of each tine, as shown, and back of this flange is a stop, $b$, extending across the bottom from side to side, and inclining backward, to prevent the insects from crawling or sliding forward, when operating. On the top of the box are secured two arms, D D, at the front ends of which are hinged two other arms, D' D', and to the said hinged arms is attached a wing or clapper, G. This wing or clapper is made adjustable up and down on the arms D' by means of screws and slots on the inside, so that it can be adjusted to suit different-sized vines. Between the arms D D is a handle, $d$, and between the arms D' D' is another, $d'$.

The trap may be made of wood or sheet-metal, or both combined.

The trap is carried in one hand by the lower or main handle $d$ and the wing G raised with the other hand by means of the handle $d'$ so that it will clear the vines. Place the front flanged edge against the infested vines at their base, and bring down the wing against the vines, beating the insects back into the trap. The insects may be retained in front of the receptacle B until they have accumulated in considerable quantity, and when necessary to secure them in the receptacle, grasp both handles firmly, press the wing back against the back of the trap, and throw the front edge of the trap upward, so as to bring the bottom nearly or quite perpendicular. Then, with a sudden forward movement of the trap, the lid C of the receptacle will fall back, and, with two or three shakes or quick forward motions, the insects will slide into the box; and when the trap is in position for the next operation the lid closes, and the insects are made secure until convenient to scald, burn, or otherwise destroy them.

Having thus fully described my invention, what I claim as new, and desire to secure by Letters Patent, is—

1. The box A constructed with a flaring mouth having tines and wings on each side, in combination with the hinged clapper, as and for the purpose set forth.

2. The clapper G made adjustable upon the arms D', and used as and for the purpose set forth.

3. In combination with the bottom of the box, the stop $b$, as and for the purpose set forth.

4. The combination, with the box A, of the chamber B having a hinged lid upon its top which operates automatically when the box is being used for catching insects, as set forth.

In testimony that I claim the foregoing I have hereunto set my hand this 10th day of January, 1873.

DAVID G. MOSHER.

Witnesses:
 JOHN J. RIGGS,
 G. W. CARR.